United States Patent [19]

Fuschetto

[11] Patent Number: 4,943,771
[45] Date of Patent: Jul. 24, 1990

[54] DIFFERENTIAL EDDY CURRENT SENSOR MEASURING APPARATUS FOR USE WITH MOVABLE MIRROR SEGMENTS

[75] Inventor: Anthony N. Fuschetto, W. Redding, Conn.

[73] Assignee: The United States of America as represented by the Secretary of the Air Force, Washington, D.C.

[21] Appl. No.: 353,992

[22] Filed: May 19, 1989

[51] Int. Cl.$^5$ .................................................. G01B 7/14
[52] U.S. Cl. .......................... 324/207.18; 324/234; 350/611
[58] Field of Search ............ 324/207, 208, 234, 238; 361/179, 180; 350/607, 608, 611

[56] References Cited

U.S. PATENT DOCUMENTS

| | | | |
|---|---|---|---|
| 2,864,997 | 12/1958 | Von Basel | 324/207 X |
| 3,397,357 | 8/1968 | Metzker et al. | 324/234 X |
| 3,585,495 | 6/1971 | Kubo et al. | 324/234 X |
| 3,721,821 | 3/1973 | Blanyer | 324/234 X |
| 3,961,243 | 6/1976 | Schulz | 324/234 X |
| 4,731,579 | 3/1988 | Petersen et al. | 324/207 |
| 4,816,759 | 3/1989 | Ames et al. | 324/207 |

FOREIGN PATENT DOCUMENTS

| | | | |
|---|---|---|---|
| 0223550 | 10/1986 | Japan | 324/238 |
| 1019030 | 5/1983 | U.S.S.R. | 324/238 |

Primary Examiner—Gerard R. Strecker
Attorney, Agent, or Firm—William Stepanishen; Donald J. Singer

[57] ABSTRACT

A differential eddy current sensor apparatus having a balance bridge to measure impedance unbalance between a pair of sensor coil which have a conductive target centered therebetween. When the target is moved toward one of the sensors the resultant impedance unbalance is detected at the bridge and demodulated by a demodulator unit to provide an analog output signal which is proportional to the target misalignment.

6 Claims, 1 Drawing Sheet

DIFFERENTIAL EDDY CURRENT SENSOR MEASURING APPARATUS FOR USE WITH MOVABLE MIRROR SEGMENTS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a eddy current sensor apparatus, and in particular to a differential eddy current sensor apparatus for edge phasing of movable or deformable mirror segments.

The state of the art of edge sensing apparatus is well represented and alleviated to some degree by the prior art apparatus and approaches which are contained in the following U.S. Patents:

U.S. Pat. No. 3,397,357 issued to Metzker et al on Aug. 13, 1968;

U.S. Pat. No. 3,961,243 issued to Schulz on June 1, 1976; and

U.S. Pat. No. 4,731,579 issued to Petersen et al on Mar. 15, 1988.

The Metzker et al patent discloses an inductive apparatus for centering a punch within its die. An annular housing which fits into the die cavity and has central passage to receive the punch. The housing contains two balanced inductors spaced equidistant from and on opposite sides of the desired path for the punch and connected to two legs of a balanced bridge circuit. When the punch is off-center, the impedances of the two inductors are unequal and the bridge circuit is unbalanced. The unbalanced bridge circuit is electrically detected and indicated.

The Schulz patent is directed to an inductive displacement transducer using a current measuring bridge circuit including a pair of adjustable electrical resistors coupled in series relationship in one half thereof, and a pair of series coupled induction coils and a movable magnetic armature in the other half of the bridge circuit. The improvement comprises a pair of series coupled electrical shunt resistors, each coupled to one of the induction coils.

The Petersen et al patent describes a magnetic position indicator using a pair of magnetic fields which are juxtaposed to each other such that they have opposite polarity and are of such a field strength that they provide for a generally linear variation in field strength extending over an elongated path which traverses the abutment of said fields.

In the prior art, edge sensors are utilized to measure or maintain incremental distances between structural elements. For example, edge sensors may be utilized to provide positional information about mirror segments which are part of large depoyable and deformable mirror. The edge sensors are utilized to maintain the shape of the desired optical surface and are needed to correct for phasing errors between the mirror segments. For complete control of such a mirror, the relative motion of each mirror segment with respect to its neighbor in three linear dimensions must be known.

The present differential eddy current sensor apparatus provides an edge sensing unit which can achieve sub-micro inch stability, avoidance of joint creep and insensitivity to temperature variation/gradients, gravity loading, and vibration disturbances.

SUMMARY OF THE INVENTION

The present invention utilizes an inductive edge sensor measuring apparatus wherein a balanced bridge circuit is utilized in conjunction with a pair of sensing coils to determine the impedance variation that is caused by eddy currents which are induced in a conductive metal target positioned between the pair of sensor coils.

It is one object of the present invention, therefore, to provide an improved differential eddy current sensor apparatus.

It is another object of the invention to provide an improved differential eddy current sensor apparatus wherein the relative motion of each segment with respect to its neighbor is determined.

It is still another object of the invention to provide an improved differential eddy current sensor apparatus wherein positional information between adjacent segments is measured.

It is a further object of the invention to provide an improved differential eddy current sensor apparatus wherein positional information between segments is utilized to achieve sub-micro inch stability.

It is still a further object of the invention to provide an improved differential eddy current sensor apparatus which is insensitive to temperature variation/gradients.

It is yet another object of the invention to provide an improved differential eddy current sensor apparatus which is insensitive to gravity loading and vibration disturbances.

It is still another object of the invention to provide an improved differential eddy current sensor apparatus which is economical to produce and utilizes conventional, currently available components that lend themselves to standard mass production manufacturing techniques.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
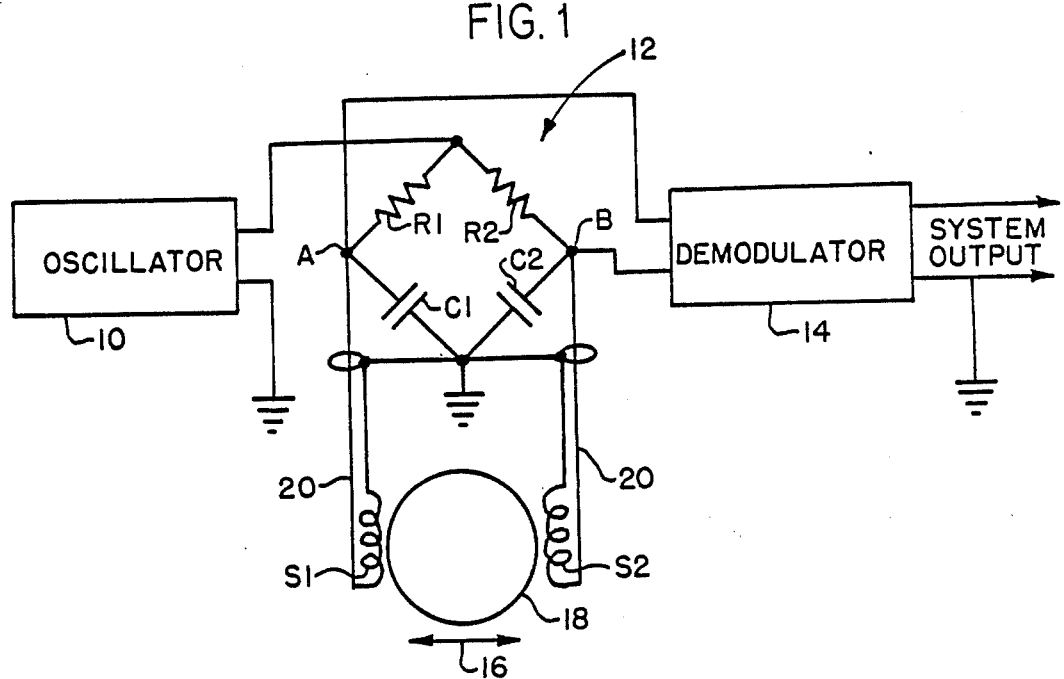
FIG. 1 is a schematic diagram of the differential eddy current sensor apparatus according to the present invention.

Referring now to FIG. 1, there is shown a schematic diagram of the differential eddy current sensor apparatus. An oscillator unit 10 is connected between ground and a balanced bridge unit 12. The balanced bridge unit 12 comprises resistors R1, R2 and capacitors C1, C2. The junction point of capacitors C1, C2 is connected to ground. The junction point of resistors R1, R2 is connected to the oscillator unit 10. A demodulator unit 14 is connected between the junction point of resistor R1 and capacitor C1, and the junction point of resistor R2 and capacitor C2. A metallic target 18 which can be moved in the directions shown by arrow 16 is positioned between first and second sensor coils, S1, S2. The first and second sensor coils S1, S2 are respectively connected by a shielded cable 20 to junction points A and B.

Figure 2:
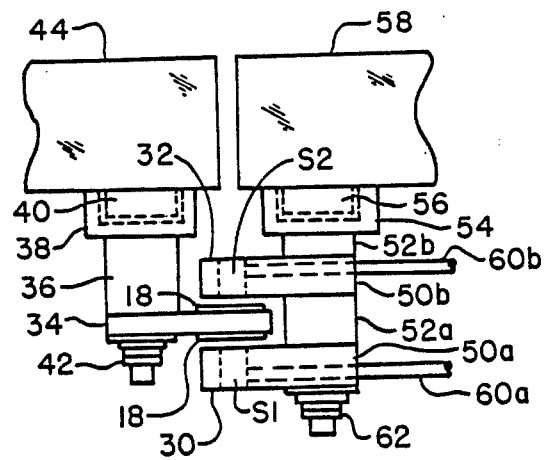
FIG. 2 is a plan view of the differential eddy current sensor apparatus.

Turning now to FIG. 2, there is shown a plan view of the differential eddy current sensor apparatus. The sensing coils S1, S2 which are supported in glass plates 30, 32, are positioned on opposite sides of a metallized copper target 18. Sensor coils S1, S2 are respectively connected to shielded cables 60a, 60b, as described above with respect to FIG. 1. Cables 60a, 60 b may comprise a commercially available cable such as RG-178 cable. In the present example, the target 18 is described as being constructed of copper, however, it should be well understood that any commercially available conductive material may be utilized as the target material. The metallized target 18 is attached to both sides of the glass plate 34. The target supporting structure which comprises plate 34, spacer 36 and pad 38, is attached to mirror segment 44 a constant force mounting means 42. The constant force mounting means 42 may comprise a conventional screw or bolt and a spring. A super invar insert 40 is positioned within pad 38.

The coil supporting structure which comprises plates 50a, 50b, spacers 52a, 52b and pad 54, is attached to mirror segment 58 by a constant force mounting means 62. The constant force mounting means 62 may comprise a conventional screw or bolt and a spring. A super invar insert 56 is positioned within pad 54.

The differential eddy current sensor apparatus provides a measuring system which uses the principle of impedance variation that is caused by eddy-currents induced in a conductive metal target that is positioned near each sensor coil. The electromagnetic coupling between each coil and the target is dependent upon the gap between the elements. Since the coils comprise a pair of sensors which are in opposite legs of an instrumentation bridge circuit in FIG. 2 the bridge is balanced and the differential output is zero when the sensors are at equal distances from the metal target. This bridge circuit implementation also effectively cancels the temperature effects which are common to the sensors and cables of a pair. When the target is moved away from one sensor and toward the opposite sensor, the coupling is no longer equal, thus causing an impedance unbalance between the sensors. This unbalance which is detected at the bridge, is amplified and demodulated to provide an analog output signal that is directly and linearly proportional to the first 600 microns of metal movement or misalignment. Beyond this distance, the output is nonlinear but can be used to detect the direction of misalignment. The mechanical design aspects in the implementation of the sensor head for edge phasing of the segments, as shown in FIG. 2, is extremely critical to achieve sub-micro inch stability. The important considerations are avoidance of joint creep and insensitivity to temperature variation/gradients, gravity loading, and vibration disturbances. In order to minimize stability errors which are due to temperature variations or gradients, zero expansion Zerodur glass is used for all mechanical components. To further insure against creep with time and also to provide a low contact thermal resistance, the glass components are: polished flat to 0.25 $\mu$m or better; assembled by wringing the flat surfaces together; and clamped with a constant force mounting by using belleville type spring washers under the screw heads. The coil assemblies are integrally mounted to the Zerodur glass plates. Pure copper is also locally metallized on the target plate.

The differential eddy current sensor apparatus has characteristics which are as follows:

| | |
|---|---|
| Static Resolution and Repeatibility | ≦.25 nm (.01$\mu$ inches) |
| Measuring Range | ±10 mils |
| Non-Linearity over ± 10 mil range | <±5$\mu$ inches |
| Non-Linearity over ± 1 mil range | <±1$\mu$ inch |
| Thermal Sensitivity Shift, ± 1° F. | <±.33$\mu$ inches |
| Long Term Stability | <±5$\mu$ inches/month |
| Sensitivity | 1 mv/$\mu$ inch |
| Coil Power Dissipation | 10$\mu$ watts |

Although the invention has been described with reference to a particular embodiment, it will be understood to those skilled in the art that the invention is capable of a variety of alternative embodiments within the spirit and scope of the appended claims.

What is claimed is:

1. A differential eddy current sensor apparatus comprising in combination:
   means for oscillating, said oscillating means providing an exciting signal,
   means for measuring, said measuring means receiving said exciting signal,
   means for sensing, said sensing means operatively connected to said measuring means and comprising a first sensing coil and a second sensing coil, said first and second sensing coils being arranged in a parallel configuration and positioned a predetermined distance part, said target being positioned between said first and second sensing coils and spaced an equal distance away therefrom,
   a target operatively arranged with said sensing means to establish an impedance level which may be sensed by said sensing means, said impedance level being balanced when said sensing means is in a predetermined alignment with said target, said sensing means providing a differential signal to said measuring means when said alignment between said target and said sensing means is disturbed, a first means for supporting said target, said first supporting means operatively attached to a first mirror segment, and a second means for supporting said first and second sensing coils, said second supporting means operatively connected to a second mirror segment.
   and means for demodulating, said demodulating means operatively connected to said measuring means to receive said differential signal, said demodulating means amplifying and demodulating said differential signal to provide an analog output signal representative of the relative position of said mirror segments.

2. A differential eddy current sensor apparatus as described in claim 1 wherein said target comprises a conductive metal.

3. A differential eddy current sensor apparatus as described in claim 2 wherein said first supporting means further includes a non-conducting plate which is operatively connected thereto, said plate operatively aligned between said first and second sensing coil, said target being metallized on said plate on opposite sides thereof and in operative alignment with said first and second coil.

4. A differential eddy current sensor apparatus as described in claim 2 wherein said second supporting means comprises a first and second non-conducting plate which are spaced apart by a non-conducting spacer.

5. A differential eddy current sensor apparatus as described in claim 2 wherein said conductive metal comprises pure copper.

6. A differential eddy current sensor apparatus as described in claim 3 wherein said first and second support means respectively comprises a zero expansion glass.

* * * * *